(12) United States Patent
Bacon et al.

(10) Patent No.: US 11,237,112 B2
(45) Date of Patent: Feb. 1, 2022

(54) RECONFIGURABLE SURFACE ENHANCED RAMAN SPECTROSCOPY DEVICE AND METHOD THEREFOR

(71) Applicant: Queen's University at Kingston, Kingston (CA)

(72) Inventors: Hannah Bacon, Toronto (CA); Aristides Docoslis, Kingston (CA); Carlos Escobedo, Kingston (CA)

(73) Assignee: Queen's University at Kingston, Kingston (CA)

(*) Notice: Subject to any disclaimer, the term of this patent is extended or adjusted under 35 U.S.C. 154(b) by 0 days.

(21) Appl. No.: 16/324,397

(22) PCT Filed: Aug. 4, 2017

(86) PCT No.: PCT/CA2017/050931
§ 371 (c)(1),
(2) Date: Feb. 8, 2019

(87) PCT Pub. No.: WO2018/027309
PCT Pub. Date: Feb. 15, 2018

(65) Prior Publication Data
US 2019/0170652 A1    Jun. 6, 2019

Related U.S. Application Data

(60) Provisional application No. 62/373,537, filed on Aug. 11, 2016.

(51) Int. Cl.
*G01N 21/65*    (2006.01)

(52) U.S. Cl.
CPC .................. *G01N 21/658* (2013.01)

(58) Field of Classification Search
CPC .................................................... G01N 21/658
See application file for complete search history.

(56) References Cited

U.S. PATENT DOCUMENTS 6,558,956 B1    5/2003  Carron et al.
6,770,488 B1    8/2004  Carron et al.
(Continued)

FOREIGN PATENT DOCUMENTS

JP      2016-099113      5/2016
WO    WO2001025757 A1    4/2001
(Continued)

OTHER PUBLICATIONS

"High Enhancement SERS Substrates Created Using DEP-DLA & Annealing Au-W", IEEE 2011 by Faisal et al.*
(Continued)

*Primary Examiner* — Jamil Ahmed
(74) *Attorney, Agent, or Firm* — Stephen J. Scribner

(57) ABSTRACT

A surface enhanced Raman spectroscopy (SERS) device, comprises a non-electrically conductive substrate, at least two microelectrodes disposed on the substrate in a spaced relationship such that a detection site is formed along edges and/or between opposing edges of the microelectrodes, and a nanoparticle structure comprising a plurality of metallic nanoparticles disposed in the detection site. Assembly of the nanoparticle structure may be directed by an electric field between the at least two microelectrodes. The SERS device is inexpensive, robust, portable, and reusable. Also described herein are methods for using and preparing the SERS devices with simple, rapid, and inexpensive fabrication techniques.

26 Claims, 9 Drawing Sheets

(56) References Cited

U.S. PATENT DOCUMENTS

| | | | |
|---|---|---|---|
| 7,688,440 | B2 | 3/2010 | Clarke et al. |
| 8,792,095 | B2 * | 7/2014 | Piorek ............... G01N 33/0057 356/301 |
| 9,255,842 | B2 | 2/2016 | Gardner et al. |
| 10,001,443 | B2 | 6/2018 | Gardner et al. |
| 2010/0040979 | A1 | 2/2010 | Weimer |
| 2011/0165586 | A1 | 7/2011 | Kim et al. |
| 2012/0242987 | A1 | 9/2012 | Liu et al. |
| 2014/0083855 | A1 | 3/2014 | Cheng et al. |
| 2014/0125976 | A1 | 5/2014 | Kim et al. |
| 2015/0374268 | A1 | 12/2015 | Yamakawa et al. |

FOREIGN PATENT DOCUMENTS

| | | |
|---|---|---|
| WO | WO2010133849 A1 | 11/2010 |
| WO | WO2014188237 A1 | 11/2014 |

OTHER PUBLICATIONS

Chowdhury, F, et al., "High Enhancement SERS Substrates Created Using DEP-DLA & Annealing Au-W", IEEE Sensors Proceeings, pp. 1-4, (2011).

Kim, M-S., et al., "Controlled Aggregation of Silver Nanoparticles Using DEP Force for SERS (Surface Enhanced Raman Spectroscopy) Analysis", IEEE Transducers The 13th International Conference on Solid-State Sensors, pp. 1768-1771, (2005).

Cheng, I-F., et al., "Rapid identification of bacteria utilizing amplified dielectrophoretic force-assisted nanoparticle-induced surface-enhanced Raman spectroscopy", Nanoscale Research Letters, vol. 9, pp. 1-8, (2014).

Dies, H. et al., "In situ assembly of active surface-enhanced Raman scattering substrates via electric field-guided growth of dendritic nanoparticle structures" Nanoscale, vol. 9, pp. 7847-7857, (2017).

Liu, C. et al., "Electrokinetic Manipulation Integrated Plasmonic-Photonic Hybrid Raman Nanosensors with Dually Enhanced Sensitivity", ACS Sensors, vol. 2, pp. 346-353, (2017).

Extended European Search Report for corresponding European Application No. 17838252.9 dated Feb. 19, 2020.

International Search Report and Written Opinion for corresponding International Application No. PCT/CA2017/050931 filed on Aug. 4, 2017.

Wu, W., et al. "Low-Cost, Disposable, Flexible and Highly Reproducible Screen Printed SERS Substrates for the Detection of Various Chemicals", Scientific Reports 5:10208, pp. 1-9, 2015.

Carron, K., et al., "SERS: Instruments, Materials, and Applications for Defense and Security", Metrohm MP-SET-253-KNP, Metrohm AG.

* cited by examiner

RECONFIGURABLE SURFACE ENHANCED RAMAN SPECTROSCOPY DEVICE AND METHOD THEREFOR

This application is a 371 of International Application No. PCT/CA2017/050931 flied on Aug. 4, 2017, and claims the benefit of the filing date of U.S. Application No. 62/373,537 filed on Aug. 11, 2016, the contents of which are incorporated herein by reference in their entirety.

FIELD

This invention relates to surface enhanced Raman spectroscopy (SERS). More specifically, this invention relates to a highly sensitive SERS device that is simple and cost effective to produce, and re-usable.

BACKGROUND

There is a pronounced global need for more sensitive and cost-effective devices to detect trace amounts of biochemical, particularly disease-causing, analytes in environmental or biological fluids. Additionally, the ability to detect biomarkers of diseases such as cancer at low levels in the early stages will allow for rapid and guided treatment, with ultimately better patient outcomes. Current detection methods, such as polymerase chain reaction (PCR), enzyme-linked immunosorbant assay (ELISA), or mass spectrometry (MS), require expensive reagents, trained personnel, and dedicated laboratory facilities for accurate and sensitive detection. Recently, Raman spectroscopy, and particularly the added sensitivity imparted by surface enhanced Raman spectroscopy (SERS), have shown promise for the sensitive detection of biomolecules, chemical contaminants, illicit drugs, and whole cells.

SERS provides a wealth of highly resolved and chemically specific vibrational information, at intensities up to 14 orders of magnitude greater than those of normal Raman spectroscopy, and through combination with fiber optics, diode lasers, and portable Raman spectrometers, represents a promising technique for point-of-care diagnostics or remote detection. SERS occurs through two mechanisms: (1) an electromagnetic enhancement, resulting from localized surface plasmon resonances—electromagnetic excitations which are confined within nanostructured metallic surfaces, and act to locally enhance both the incident electromagnetic field and the scattered Raman field; and (2) a chemical enhancement, resulting from charge transfer between the metal and the adsorbed analyte. SERS is often performed in colloidal solutions of suspended nanoparticles; however, this method of detection suffers from poor reproducibility, inhomogeneous nanoparticle/analyte distributions, and a transiency of SERS active sites. Therefore, a precisely fabricated, well-structured, nanosubstrate is key to good SERS detection. Current methods of nanofabrication are expensive and time-consuming, requiring dedicated clean room facilities, as well as involved techniques such as focused ion beam etching, electron beam lithography, atomic layer deposition, or metal film over nanosphere deposition. Unfortunately, the costs and specific requirements limit the wide-spread use of SERS.

SUMMARY

Described herein is a surface enhanced Raman spectroscopy (SERS) device, comprising: a non-electrically conductive substrate; at least two microelectrodes disposed on the substrate in a spaced relationship such that a detection site is formed along edges and/or between opposing edges of the microelectrodes; and a nanoparticle structure comprising a plurality of metallic nanoparticles disposed in the detection site.

Assembly of the nanoparticle structure may be directed by an electric field between the at least two microelectrodes. The electric field may comprise an AC electric field. The electric field may comprise an AC electric field with a DC component. The electric field may comprise a DC electric field. The electric field may comprise an electrostatic field. The nanoparticle structure may be a branched, clustered, aggregated, fractal, and/or dendritic structure. In one embodiment, the nanoparticle structure is a dendritic structure.

The nanoparticles may be functionalized. The functionalized nanoparticles may include a surface modification. The surface modification may include at least one protein, nucleic acid, or functional molecule, molecular fragment, epitope, or a combination thereof, disposed on at least one nanoparticle.

Also described herein is a method of preparing a SERS device, comprising: providing a non-electrically conductive substrate having at least two microelectrodes disposed on the substrate in a spaced relationship such that a detection site is formed between opposing edges of the microelectrodes; and disposing a plurality of metallic nanoparticles on the detection site under a condition that induces, directs, or influences assembly of the metallic nanoparticles into a nanoparticle structure in the detection site.

The condition that induces, directs, or influences assembly of the metallic nanoparticles into a nanoparticle structure may include an electric field between the at least two electrodes. The electric field may comprise an AC electric field. The electric field may comprise an AC electric field with a DC component. The electric field may comprise a DC electric field. The electric field may comprise an electrostatic field.

Also described herein is a method of preparing a SERS device, comprising: providing a non-electrically conductive substrate having at least two microelectrodes disposed on the substrate in a spaced relationship such that a detection site is formed along edges and/or between opposing edges of the microelectrodes; and disposing a plurality of metallic nanoparticles on the detection site in the presence of an electric field between the at least two microelectrodes; wherein the metallic nanoparticles assemble into a nanoparticle structure in the detection site in the presence of the electric field. The method may comprise using an AC electric field, optionally with a DC component. The method may comprise assembling a branched, clustered, aggregated, fractal, or dendritic nanoparticle structure, or a combination thereof.

The methods may comprise using functionalized nanoparticles. Functionalized nanoparticles may include a surface modification of the nanoparticles. Functionalized nanoparticles may include at least one protein, nucleic acid, or functional molecule, molecular fragment, epitope, or a combination thereof, on at least one nanoparticle.

The methods may comprise using the electrodes and the nanoparticle structure to concentrate an analyte at the detection site.

The methods may comprise removably assembling the dendritic nanoparticle structure in the detection site.

Also described herein is a method of analyzing a sample using SERS, comprising: providing a non-electrically conductive substrate having at least two microelectrodes disposed on the substrate in a spaced relationship such that a detection site is formed along edges and/or between opposing edges of the microelectrodes; disposing a plurality of metallic nanoparticles on the detection site under a condition that induces, directs, or influences assembly of the metallic nanoparticles into a nanoparticle structure in the detection site; applying the sample to the detection site; and using SERS to probe the sample at one or more locations in the detection site.

The condition that induces, directs, or influences assembly of the metallic nanoparticles into a nanoparticle structure may include an electric field between the at least two electrodes. The electric field may be an AC electric field, a DC field, or an electrostatic field. The electric field may include an AC field with a DC component. The method may include the presence of the electric field during assembly of the nanoparticle structure and during application of the sample.

The method may comprise concentrating an analyte in the sample at the detection site.

The method may further comprise removing the nanoparticle structure and the sample; and re-using the non-electrically conductive substrate having at least two microelectrodes.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 2A-2H are images of SERS devices according to various embodiments, wherein FIGS. 2A and 2C are photomicrographs of AgNP structures produced on microelectrodes through electrokinetic deposition, and FIGS. 2B and 2D are corresponding SEM images of the nanostructures; FIG. 2E is a photomicrograph of AgNP structures produced on microelectrodes through electrokinetic deposition by applying a DC offset, and FIG. 2F is a SEM image of the nanostructures; FIG. 2G is a photomicrograph of microelectrodes with electrokinetic deposition of AuNPs, and FIG. 2H is a SEM image of the AuNPs.

FIGS. 6A-6C are plots showing detection of analytes using a SERS device according to one embodiment, wherein FIGS. 6A, 6B, and 6C show results for melamine, cocaine, and thiram respectively, using passive surface adsorption of the analytes; all spectra represent averages from three different locations on the SERS device.

DETAILED DESCRIPTION OF EMBODIMENTS

Figure 1:
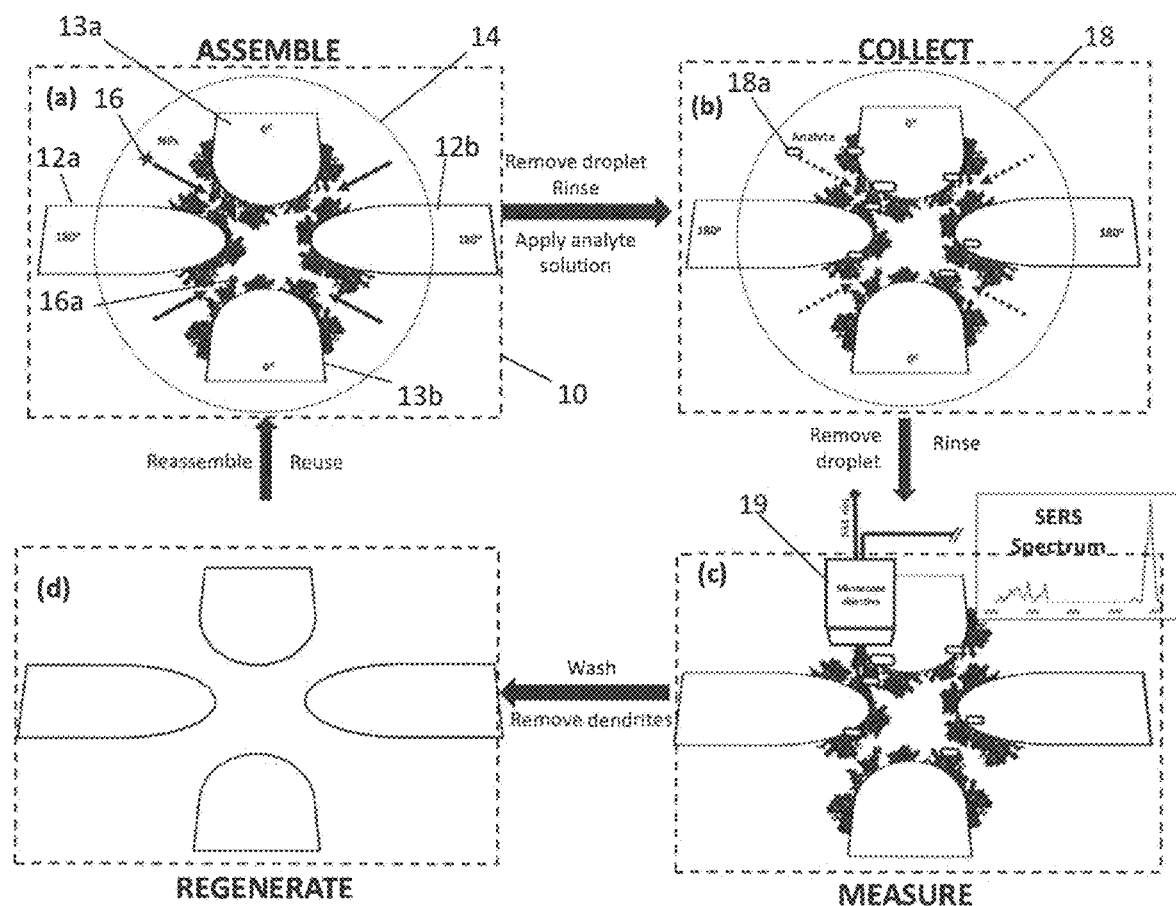
FIG. 1 is a schematic representation of (a) preparation of a nanoparticle structure on microelectrodes of a SERS device, (b)-(c) use of the SERS device to detect an analyte, and (d) removal of the nanoparticle structure so that the microelectrodes may be reused, according to one embodiment.

Described herein are SERS devices that are inexpensive, robust, and portable. Additionally, a SERS device as described herein may be reusable. Also described herein are methods for using and preparing the SERS devices with simple, rapid, and inexpensive fabrication techniques.

As used herein, the term "SERS device" refers to a device that may be used to analyze an analyte using Raman spectroscopy, comprising a solid substrate, two or more microelectrodes disposed on the substrate, and nanoparticles disposed on the structure such that the nanoparticles form a nanoparticle structure between the two or more microelectrodes according to an electric field between the microelectrodes.

As used herein, the term "solid substrate" refers to a support material for a SERS device, on which the two or more microelectrodes are disposed. The solid substrate is robust, meaning that it has one or more characteristics such as: self-supporting, resists bending, washable, and waterproof. Although the solid substrate resists bending (e.g., it does not bend in the absence of applied force), it may be flexible. The solid substrate is not electrically conductive, and may comprise one or more materials such as, for example, silicon, glass, quartz, alumina, polymer, paper.

The terms "electrode" and "microelectrode" are used interchangeably herein. In general, the size of electrodes may vary substantially. In accordance with embodiments described herein, electrodes may be sized as appropriate for a given application and design of a SERS device. For example, electrodes may be micron-scale, millimeter-scale, or larger.

As used herein, the term "detection site" refers to an area anywhere along and/or in the vicinity of electrode edges where dendrites may be formed, where an analyte may be detected. A detection site may include, for example, an area between two or more electrodes where an analyte may be detected. A sample under investigation may be placed on the SERS device at a detection site.

A surface of the solid substrate material may be coated, or have deposited thereon, an electrically conducting layer that forms the two or more microelectrodes. The electrically conducting layer may include a metal (which may comprise a single metal or an alloy, in one or more layers) or one or more non-metallic materials (such as carbon, graphene, an electrically conducting polymer (e.g., polypyrrole), or an electrically conducting polymer composite). The two or more electrodes may be disposed in a 2-D or 3-D (e.g., non-planar) configuration, and are arranged in a spaced relationship such that one or more detection site is formed between opposing edges of the two or more microelectrodes. For example, one or more electrodes may be disposed on a substrate, and one or more electrodes may be disposed on a tip of a device (e.g., a probe), and the substrate and the tip of the device are arranged such that a 3-D electrode configuration is produced. This configuration may allow the tip electrode(s) to be moved relative to the substrate electrodes. In another example, one or more electrodes may be disposed on a first substrate, and one or more electrodes may be disposed on a second substrate, and the first and second substrates arranged face-to-face (e.g., substantially co-planar, or at a selected angle) such that a 3-D electrode configuration is produced. The two or more microelectrodes may be deposited in their final form, or they may be formed, or their shape and/or size and/or spacing may be adjusted, by subsequently removing metal (e.g., by using a mechanical, chemical, laser, and/or micromachining technique). For example, the shape, size, and or spacing of the two or more microelectrodes may be carried out to adjust or tailor the size or shape of the detection site. Surface preparation of the solid substrate may be employed as necessary prior to depositing the metal, as would be apparent to one or ordinary skill in the art, to enable or enhance adhesion of the metal to the solid substrate.

As used herein, the terms "nanoparticle structure" and "nanostructure" refer to a structure that is assumed or achieved by metallic nanoparticles in the detection site, under a condition that induces, directs, or influences assembly of the metallic nanoparticles into the nanoparticle structure. The condition includes an electric field between the at least two electrodes, which may be generated by applying an electrical potential difference across the two or more electrodes. In one embodiment, the electric field may be an AC electric field. In another embodiment, the AC electric field may include a DC component, or DC offset. In another embodiment, the electric field may be a DC electric field. In another embodiment, the electric field may be an electrostatic field. An electrostatic field may be generated by providing static electric charges to the electrodes. For example, charged molecules (e.g., dissociable molecules, such as polylysine, ionic surfactants, DNA), or particles carrying dissociable groups, may be disposed on the electrodes, which then generate the electrostatic field without an external electric circuit or power supply. In general, a nanoparticle structure may be formed in response to an electric field that causes nanoparticle attraction/motion of a scale similar to random motion (i.e., Brownian motion).

The nanoparticle structure includes nanoparticles assembled into a branched, clustered, aggregated, fractal, and/or dendritic structure. The metallic nanoparticles may be prepared from a single metal, or an alloy of two or more metals. Metallic nanoparticles may comprise a mix of nanoparticles comprising different metals. The metal(s) may be selected from, but is (are) not limited to, silver, gold, copper, and platinum.

A SERS device as described herein achieves two design principles: (1) strong SERS enhancement, in that it improves sensitivity of detection, and (2) effective surface coverage. However, in prior approaches these goals are often competing; compact aggregates of nanoparticles that are entirely deposited at an absolute energy minimum may produce strong SERS enhancement due to the density of localized surface plasmon resonance (LSPR) producing nanoparticles; however, they do not present a significant surface area for analyte adsorption and subsequent SERS detection.

Embodiments described herein overcome this tradeoff by providing strong LSPR coupling between nanoparticle structures, which may include branches, clusters and/or dendrites. As described herein, this may be achieved through electrokinetic deposition of metallic nanoparticles, i.e., electric field driven assembly of nanoparticle structures. Electrokinetic deposition comprises applying an alternating current (AC) waveform, e.g., sine, square, triangular, sawtooth, etc., to the two or more microelectrodes to generate an electric field between them (i.e., across the detection site). In some embodiments a direct current (DC) offset may also be applied to the two or more microelectrodes. In some embodiments a DC electric field or an electrostatic field may be applied to the two or more microelectrodes. The electric field acts on the nanoparticles to influence, induce, or direct formation of the nanoparticle structure, including, in some embodiments, the formation of branches, clusters and/or dendrites. The nanoparticle structure may be "active", which refers to the fact that characteristics of the structure, including the formation and extent of branches, clusters, and/or dendrites, may be controlled, tuned, and/or optimized during deposition as well as during analysis of a sample (i.e., dynamically) by providing and optionally controlling an electric field across an electrode gap. For example, an electric field may be controlled by adjusting one or more parameters (e.g., voltage, current, frequency, shape of waveform, duty cycle) of the AC current, and optionally the DC offset, to thereby adjust the electric field. Results show that nanoparticle structures such as dendrites not only have good coverage across the substrate surface, they also act as extensions of the microelectrodes, locally enhancing the electric field and enabling active analyte transport to the detection site.

The metallic nanoparticles may exhibit two properties: (1) high aspect ratio and/or anisotropy (e.g., a high surface to volume ratio as provided by non-spherical or irregular shape, such as nanorod, pyramid, semi-spherical, decahedral, etc., wherein two or more irregular shapes may be used); and (2) surface irregularities (e.g., varied surface topography or surface features such as bumps, points, nanostars, nano-urchins, etc.).

Additionally, or alternatively, nanoparticles and/or nanoparticle structures such as dendrites may be functionalized with, for example, one or more of a protein (e.g., enzyme, antibody), antibody fragment (e.g., an epitope), nucleic acid (e.g., RNA, DNA, aptamer), or functional molecule (e.g., a self-assembled monolayer (SAM) comprising hydrocarbon tails terminating at two functional groups, one group on either side of the chain), including combinations thereof, in order to optimize specificity and sensitivity for a selected analyte. For example, nanoparticles may be prepared that project certain surface functional groups, to assist in the coupling of an analyte with the nanoparticles. Surface modification/functionalization may include application of a carbon-based material such as graphene and graphene derivatives to nanoparticles and/or to nanoparticle structure such as dendrites. For example, graphene oxide, reduced graphene oxide, or multilayer graphene particles may be deposited on the nanoparticle structure, and/or the nanoparticles, to increase the SERS signal. Graphene materials may be deposited as a coating by, e.g., spraying or otherwise applying a suspension of graphene-based nanoplatelets directly on the surface of the nanoparticle structure and/or under the nanoparticle structure (e.g., by applying the coating first, and then assembling the nanoparticle structure on top of the coating. Functionalized nanoparticles enhance SERS detection of an analyte by binding to the analyte and concentrating it at the detection site. Functionalized nanoparticles may be used alone or together with an electric field to concentrate the analyte at the detection site.

FIGS. 1A-1D show a schematic representation of the preparation and use of a SERS device, according to one embodiment. According to this embodiment, four microelectrodes 12a, 12b, 13a, 13b (i.e., a quadrupolar microelectrode array) are disposed on the substrate 10. Detection sites are indicated by four arrows in FIG. 1A. In FIG. 1A a droplet 14 containing metallic nanoparticles 16 is placed on the microelectrode array and the array is activated by applying an AC voltage to the microelectrodes, with opposite pairs of microelectrodes (i.e., 12a, 12b, and 13a, 13b) having the same polarity. The nanoparticles 16 become assembled, through electric field-induced effects, into branched or dendritic nanostructures 16a. The droplet containing metallic nanoparticles is then removed with a stream of air and the device is rinsed with deionized water. FIG. 1B shows active analyte collection, wherein a droplet of the sample 18 is placed on the SERS device and analyte particles 18a are concentrated to the detection sites. In FIG. 1C Raman micro-spectroscopy 19 is used to probe a detection site and identify/quantify the analyte. In FIG. 1D the microelectrode array is washed with a surfactant solution (e.g., dish soap), to remove the dendrites and the sample so that the SERS device may be reused.

Whereas FIGS. 1A-1B show an embodiment of a 2-D configuration, in other embodiments the electrodes may be disposed in a 3-D configuration. For example, one array of electrodes may be disposed on one surface (all at the same electric charge) and a counter-electrode array (opposite charge) disposed on a surface facing the former (e.g., analogous to two opposing walls).

The observed movement and assembly of metallic NPs under an AC electric field is believed to be caused by one or more of: (1) Brownian motion of nanoparticles; (2) dielectrophoresis (DEP), a deterministic force which acts directly on polarizable particles in a spatially non-uniform electric field; (3) mutual DEP, an attractive, electric-field generated particle-particle interaction, which acts generally to cause chaining between induced dipoles; (4) electrophoresis (EP), a deterministic force which acts directly on charged particles in an electric field; and (5) electrohydrodynamic fluid flows, which include AC electroosmosis (ACEO), and AC electrothermal flow (AC ETF). At some AC electric field conditions (e.g., voltage, frequency), these three electrokinetic forces may compete, preventing significant NP organization and retention within complex structures. Generally, ACEO acts in a frequency range from 100 Hz-100 kHz (although this range depends on the conductivity of the medium), and AC ETF dominates at AC frequencies greater than 100 kHz.

The organized, extended dendritic nanostructures are believed to form through a mass transfer controlled process involving dielectrophoresis and dipolar particle chaining forces. The time-averaged dielectrophoretic force $\langle F_{DEP} \rangle$ on a spherical particle is given by:

$$\langle F_{DEP} \rangle = 2\pi\varepsilon_m r^3 \mathrm{Re}[\tilde{K}(\omega)]\nabla|E|^2 \quad (1)$$

where $\varepsilon_m$ is the permittivity of the medium, r is the radius of the particle, E is the root-mean-square intensity of the electric field, and $\tilde{K}(\omega)$ represents the complex valued Clausius-Mossotti factor, a measure of the particle's polarizability with respect to the medium. For conductive nanoparticles, this value is positive across a comprehensive range of experimental frequencies (<10 GHz), thus dielectrophoresis acts in the direction of high electric field gradient regions (this is referred to as positive DEP, pDEP). Additionally, for nanoparticles with asymmetric geometries, or high aspect ratios, $\mathrm{Re}[\tilde{K}(\omega)]$ may be much greater than one, allowing for more intense attractive DEP forces and an orientation torque that facilitates branching and dendrite growth.

Metallic dendritic nanostructures have been produced previously, primarily through electrochemical processes involving deposition and reduction from metal ion-containing solutions (Yu, J. et al., "Synthesis of Dendritic Silver Nanoparticles and Their Applications as SERS Substrates", *Adv. Mater. Sci. Eng.*, 2013: 1-4; He, L. L., et al., "Surface-enhanced Raman spectroscopy coupled with dendritic silver nanosubstrate for detection of restricted antibiotics", *J. Raman Spectrosc.*, 41: 739-744, 2010; Wang, Q., et al., "Ag dendritic nanostructures or rapid detection of thiram based on surface-enhanced Raman scattering", *RSC Adv.*, 5: 70553-70557, 2015; Fei Chan, Y., et al., "Ag dendritic nanostructures as ultrastable substrates for surface-enhanced Raman scattering", *Appl. Phys. Lett.*, 102: 183118, 2013). Such dendrites function as highly enhancing substrates (particularly when produced with Ag), due to broadening of the plasmon resonance through coupling of nanoparticles on closely spaced dendrite branches (Kneipp, K., et al., "Surface-enhanced Raman scattering and biophysics", *J. Phys. Condens. Matter*, 14: R597-R624, 2002). However, while Ag has the highest enhancement factor of the noble metals, it is the least stable (it oxidizes in atmospheric conditions); therefore, to be able to take advantage of its enhancing capabilities, a method for in situ, rapid, and point of use Ag dendrite fabrication is necessary.

The process of dendrite formation is a mass transfer controlled process, which occurs primarily through short-range dielectrophoretic forces, at a threshold local nanoparticle concentration and attractive force magnitude. In accordance with embodiments described herein, a voltage of approximately 2.5-3.5 V peak-to-peak allows dipolar chaining forces (e.g., mutual DEP) to promote the formation of extended dendritic nanoparticle structures by overcoming electrostatic repulsion between the charged nanoparticles. Because metallic nanoparticles are conductive, the pDEP-mediated accumulation of NPs effectively extends the electrodes, locally distorting the electric field and creating high field regions that promote wire extension. Whereas pDEP-mediated organization of conductive nanoparticles has been previously noted, such organization has been limited to unidirectional chains or wire-like structures (see, e.g., Papadakis, S. J., et al., "Dielectrophoretic assembly of reversible and irreversible metal nanowire networks and vertically aligned arrays", *Appl. Phys. Lett.*, 88, no. 23: 233118, 2006; Ranjan, N., et al., "Growing one-dimensional metallic nanowires by dielectrophoresis", *Small*, 2: 1490-6, 2006).

However, as described herein, for branching and dendrite formation, rather than unidirectional elongation, the nanoparticles must be moving slowly, and experiencing small enough forces to be able to sample a variety of energy states. Thus there exists a small window of electrokinetic parameters in which dendrite formation may occur: the voltage must be large enough to allow for close nanoparticle association yet not so large as to cause aggregation at a single high field region, and the frequency must minimize electrohydrodynamic fluid flow to allow for mass-limited growth to occur.

Embodiments include a combination of features, such as electric field-guided assembly of metallic nanoparticles, plasmonically active dendritic structures, and electrode structures and nanoparticle (e.g., dendritic) structures that locally concentrate an analyte. Together, this combination features provide a SERS device which is ultrasensitive for the detection of trace amounts analytes.

Additionally, embodiments feature a solid substrate which provides a structure that is robust, reusable, and reconfigurable. In this feature, embodiments contrast sharply with prior devices having soft substrates (e.g., paper in some prior devices). Because of the solid substrates, the dendrites may be removed (e.g., by washing with a simple surfactant solution such as soap) from the surface after use, and replaced by applying fresh nanoparticles. Furthermore, a solid substrate enables use of fabrication techniques compatible with mass production, allowing for the production of "SERS-on-a-chip" devices, at very low cost per chip, as well as being compatible with microfluidic devices. Although photolithography (clean room) facilities may be used for preparation, this is not always necessary as some embodiments, particularly those with larger and simpler electrodes configurations, may be assembled on a work/lab bench, or using simplified equipment which may include a small hand-held device. For example, the active dendrite assembly process may take place inside a hand-held device where the nanoparticles are supplied in the form of a suspension contained in a cartridge. Such embodiments thus remove the need for specialized facilities and equipment, thereby significantly reducing cost and preparation time without sacrificing sensitivity.

A SERS device as described herein may be assembled independently at multiple locations on the same chip, thus allowing multiple analyte detection to occur simultaneously. SERS devices and methods as described herein are compatible with fibre optics and modular Raman microscopes, allowing for miniaturization and improved portability. For example, embodiments may be configured and adapted for field use and for hand-help use. SERS devices and methods as described herein provide for devices to be built virtually anywhere within a few minutes. For example, a SERS device may be built in situ, immediately prior to a detection event, avoiding substrate deterioration (e.g., oxidation).

Embodiments will be further described by way of the following non-limiting Examples.

Example 1

SERS devices were fabricated as described herein and used to detect rhodamine, melamine, thiram, and cocaine, bovine serum albumin (BSA), and *Escherichia coli* (*E. coli*) K12.

Materials

Rhodamine 6G (R6G, 99%), melamine (99%), thiram (Pestanal®, analytical standard), cocaine (1 mg/mL, in acetonitrile), bovine serum albumin (BSA, >98%) and avidin-FITC (from egg white) were purchased from Sigma-Aldrich (Oakville, ON). Silver nanoparticles (AgNPs) of 50 nm in diameter, stabilized in 2 mM citrate, and spherical gold nanoparticles (AuNPs) of 60 nm in diameter, stabilized in 0.1 mM PBS were obtained from Cytodiagnostics Inc. (Burlington, ON). Polished silicon wafers (4" diameter) with a thermally grown $SiO_2$ layer (0.5 µm) were purchased from University Wafer (South Boston, Mass.). Millipore® water (18.2 MΩ cm) was used throughout the experiments.

Microchip Fabrication

The microfabrication of electrodes was carried out at Kingston Nanofabrication Facility (KNFL, Innovation Park, Kingston, ON) through maskless photolithography on silicon wafers as the substrates, followed by electron beam metal film evaporation and liftoff. A negative photoresist (SU-8, MicroChem Corp, Westborough, Mass.) was used with the IMP maskless photolithography system to transfer the microelectrode pattern to the silicon substrate. A 5 nm layer of chrome was used to improve the adhesion of the deposited Au layer (100 nm thickness) to the silicon substrate.

Analyte Sample Preparation

R6G was dissolved in methanol at a stock concentration of 0.1 M, and diluted in methanol/water (1:1) to generate solutions of 1 mM, 0.1 mM, 0.01 mM, 0.001 mM, 100 nM, 10 nM, and 1 nM. Melamine was dissolved in water to a stock concentration of 1 mg/mL (1000 ppm) and diluted in water to generate solutions of 100 ppm, 10 ppm, 1 ppm, 100 ppb, 10 ppb, 1 ppb, and 100 ppt. Cocaine was purchased dissolved in acetonitrile at a stock concentration of 1000 ppm, and diluted in water to generate solutions of 100 ppm, 10 ppm, 1 ppm, 100 ppb, 10 ppb, and 1 ppb. *E. coli* was grown on LB agar plates. Low conductivity suspensions (1.0±0.5 mS/m) were created by suspending the bacteria in water, centrifuging at 6000 rpm for 10 min, and repeating the suspension/centrifugation step twice. The concentration of the suspension was determined with the use of a Petroff-Hausser bacteria counter.

Nanoparticle Solution Preparation

It was determined that for effective surface coverage, a pre-concentration step prior to electrokinetic deposition of nanoparticles was required. Therefore, all nanoparticle solutions were concentrated through centrifugation at 3800 g for 20 minutes, followed by removal of the supernatant to reach a final concentration of $2.9 \times 10^{11}$ particles/mL. Samples were sonicated post-concentration, and dynamic light scattering (DLS) and zeta potential measurements, on a Malvern Zetasizer Nano were used to ensure a unimodal, non-aggregated, stable dispersion over a period of time suitable for multiple experiments.

Electrokinetic Nanoparticle Deposition

All experiments were carried out at room temperature. Bacterial suspensions were used immediately after dilution. A 10 µL sample of concentrated NP solution was placed over the microelectrode array center using a micropipette (e.g., FIG. 1A). Electrokinetic nanoparticle assembly was performed for 12 minutes at 10 Hz and 2.5 $V_{pp}$, (sine waveform) with a DC offset of 0.5 V. Following NP deposition, the chip was washed with water and dried in a stream of air.

For smaller analytes (R6G, melamine, cocaine, and thiram) passive analyte collection (i.e., passive adsorption) was used, wherein 2 µL of analyte solution was deposited over the microelectrode array surface and the solvent was allowed to evaporate prior to detection. For larger analytes (BSA or *E. coli*), active analyte collection was performed electrokinetically prior to detection: a 10 µL droplet of analyte solution was deposited over the microelectrode array centre, and the collection was run for 15 minutes at 10 kHz and 15 $V_{pp}$.

Surface Characterization

Scanning electron microscopy (SEM) was performed at the Queen's Facility for Isotope Research, on a MLA 650 FEG environmental SEM, at a voltage of 5.00 kV. Optical microscopy was performed on an Olympus BX-41 microscope of a Raman micro-spectrometer. ImageJ was used for processing of SEM images and percentage surface coverage analysis. Fluorescent microscopy was carried out on an Olympus 1X83 inverted fluorescence microscope with a green fluorescent protein (GFP) filter.

Raman Measurements and Spectral Processing

A HORIBA Jobin Yvon Raman Spectrometer (Model: LabRAM) with a 632.8 nm He/Ne laser (17 mW), 1800 l/nm grating and an Olympus BX-41 microscope system were used. The collection of spectra was performed in the back-scattered mode under the following conditions: ×100 microscope objective, 500 µm pinhole, 500 µm slit width. All Raman spectra were background-corrected through polynomial subtraction, and noise was reduced with a Savitsky-Golay filter.

Optimization of Electrokinetic Nanoparticle Deposition

Optimization experiments were conducted across a wide range of voltage and frequency conditions. A window for dendrite formation was found to include a frequency of about 1-100 Hz, and a voltage of about 2.5-3.5 V peak-to-peak (i.e., an electric field intensity of about $1.5$-$2.1 \times 10^5$ V/m). For example, in one experiment, extended dendrites were formed at 10 Hz, 2.9 V peak-to-peak (Vpp). According to these conditions, within 12 minutes of field activation, dendrites extending ~15 µm were produced between adjacent microelectrodes, as shown in the optical microscopy and SEM images in FIGS. 2A and 2B.

Figures 2A, 2B, 2C, 2D, 2E, 2F, 2G, 2H:
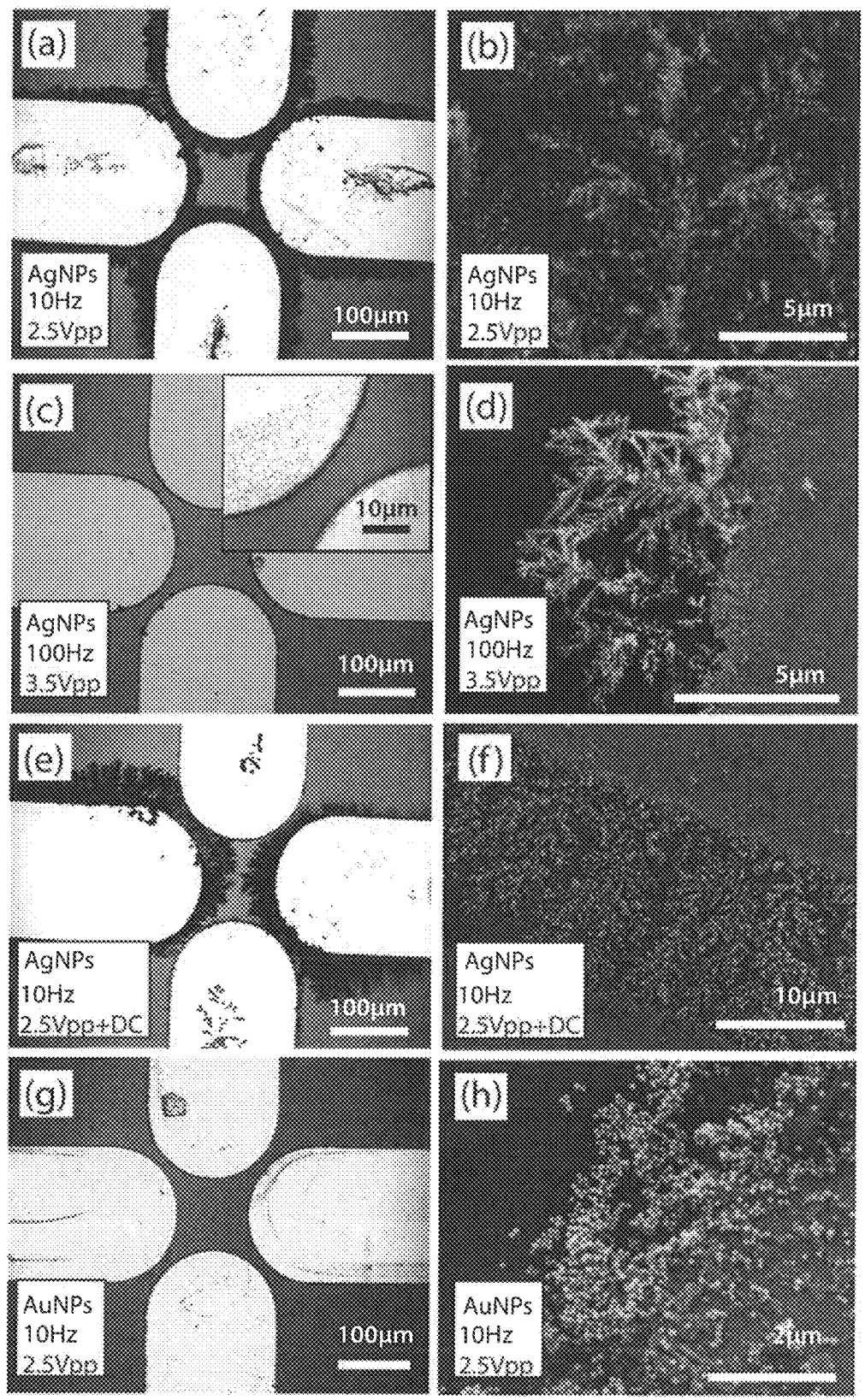

In FIG. 2A, AgNPs (silver nanoparticles 50 nm in diameter, stabilized in 2 mM citrate) were used at 10 Hz and 2.5 Vpp, with a sine waveform. Optical microscopy shows effective surface coverage of the microelectrode detection site with AgNP dendrites, and in FIG. 2B SEM images show intricate branching of these structures, allowing for LSPR coupling and high SERS activity. In FIG. 2C at 100 Hz, some AgNP dendrites form in small areas around the dendrites, which can be seen in the SEM image of FIG. 2D, but coverage across the microelectrode detection site is less extensive. In FIGS. 2E and 2F, a DC offset was applied, resulting in the dendrites growing directionally, with better extension.

For FIGS. 2G and 2H, AuNPs (spherical gold nanoparticles 60 nm in diameter, stabilized in 0.1 mM PBS) were used under the same frequency and voltage as for the AgNPs. Under these conditions the AuNPs did not produce dendrites, rather they produced a dense layer of nanospheres along the microelectrode edge, as can be seen in the SEM image in FIG. 2H. This may be due to the different stabilizing solutions of the nanoparticles (2 mM citrate for AgNPs, and 0.1 mM PBS for AuNPs), or the different shapes of the nanoparticles—the AuNPs were observed under SEM to be highly spherical (see FIG. 2H), while the AgNPs were of random anisotropic geometry.

With an AC electric field only (no DC offset), the dendrites grew at equal rates from both electrodes, as shown in FIG. 2A. Applying a small DC offset caused more extensive dendrite growth, and selective growth in a directional manner from a single electrode. In FIG. 2E a positive (the AgNPs have a negative zeta potential) DC offset of 0.5 V was applied, while keeping the magnitude of the peak-to-peak voltage constant. The resulting dendrite growth was on only one of the microelectrode pairs, and extended across the gap without shorting the microelectrodes. The DC offset may promote dendrite growth by allowing EP, a longer ranged force than DEP, to bring NPs to the site of dendrite formation, enabling the mass-limited aggregation process. This has two major benefits, which may be used separately or simultaneously to enhance active analyte concentration: (1) direct analyte concentration amplification, wherein the resulting smaller microelectrode gap results in stronger electrical forces which are capable of attracting smaller analytes (e.g., proteins, DNA) from the bulk of the analyte solution to the detection site; and (2) the smaller microelectrode gap can generate strong electric field-induced fluid flow patterns (electroosmosis, electrothermal forces) that can act as "conveyor belts" that transport analyte from the bulk to the surface of the dendrites, thereby enhancing its adsorption or capture rates. It is noted that the resulting microelectrode gaps are extremely small (e.g., micron or submicron scale) and may be difficult to reproduce with standard photolithographic techniques. Therefore, this method of enhancing dendrite growth provides embodiments with small microelectrode gaps while avoiding the need for specialized production techniques or equipment, and the associated cost.

SERS Device Characterization with Rhodamine 6G

Figure 3:
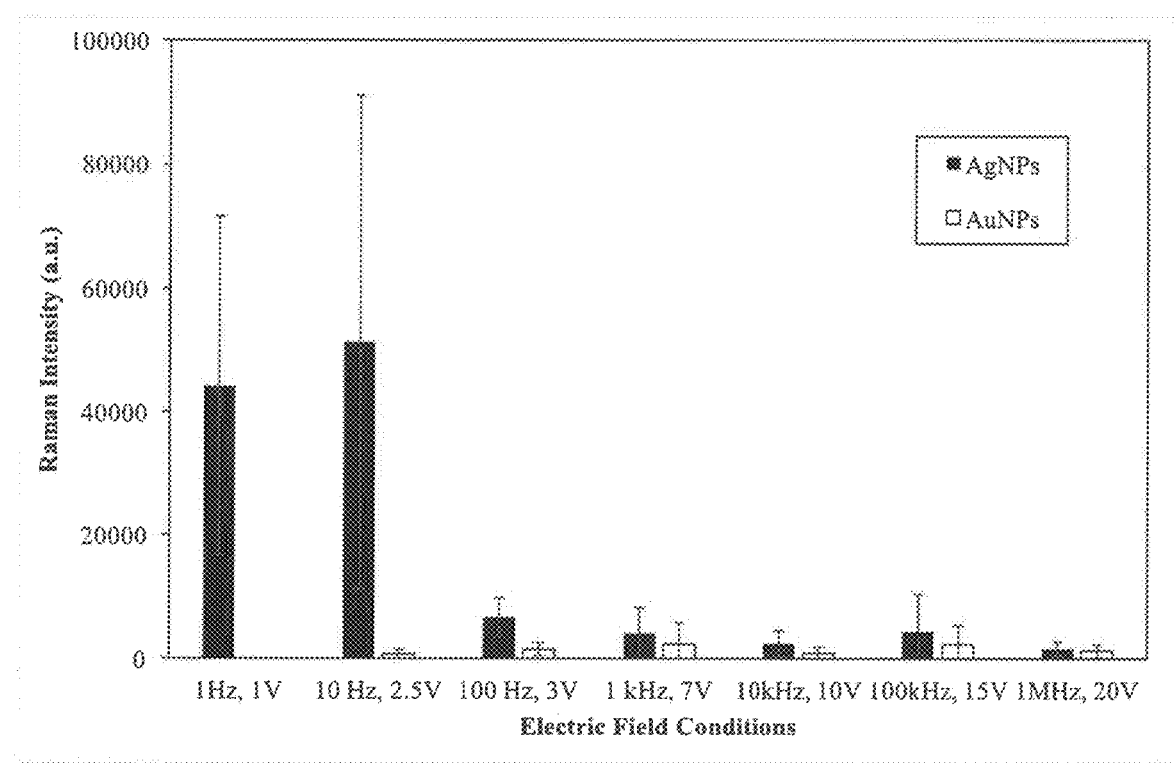
FIG. 3 is a plot showing performance of SERS devices formed at different electric field conditions, for AuNPs and AgNPs, quantified through the intensity of the 1360 cm$^{-1}$ peak in the SERS spectrum for R6G.

FIG. 3 shows the results of optimization experiments conducted with embodiments using AgNPs and AuNPs, where SERS performance is quantified through the intensity of a key peak (1360 cm$^{-1}$) in the Raman spectrum of rhodamine 6G (R6G), a Raman reporter molecule with a distinct and strong Raman spectrum. The R6G spectrum is characterized by Raman peaks at 612, 1179, 1306, 1360, 1505, 1567, 1595, and 1646 cm$^{-1}$. From FIG. 3 it can be seen that the peak intensity of the AuNP embodiment was always significantly reduced compared to the AgNP embodiment. This was an expected result, since Au is inherently less SERS-active than Ag, and, under the electric field conditions, formation of dendrites from AuNPs was not observed (FIGS. 2G and 2H).

Figure 4:
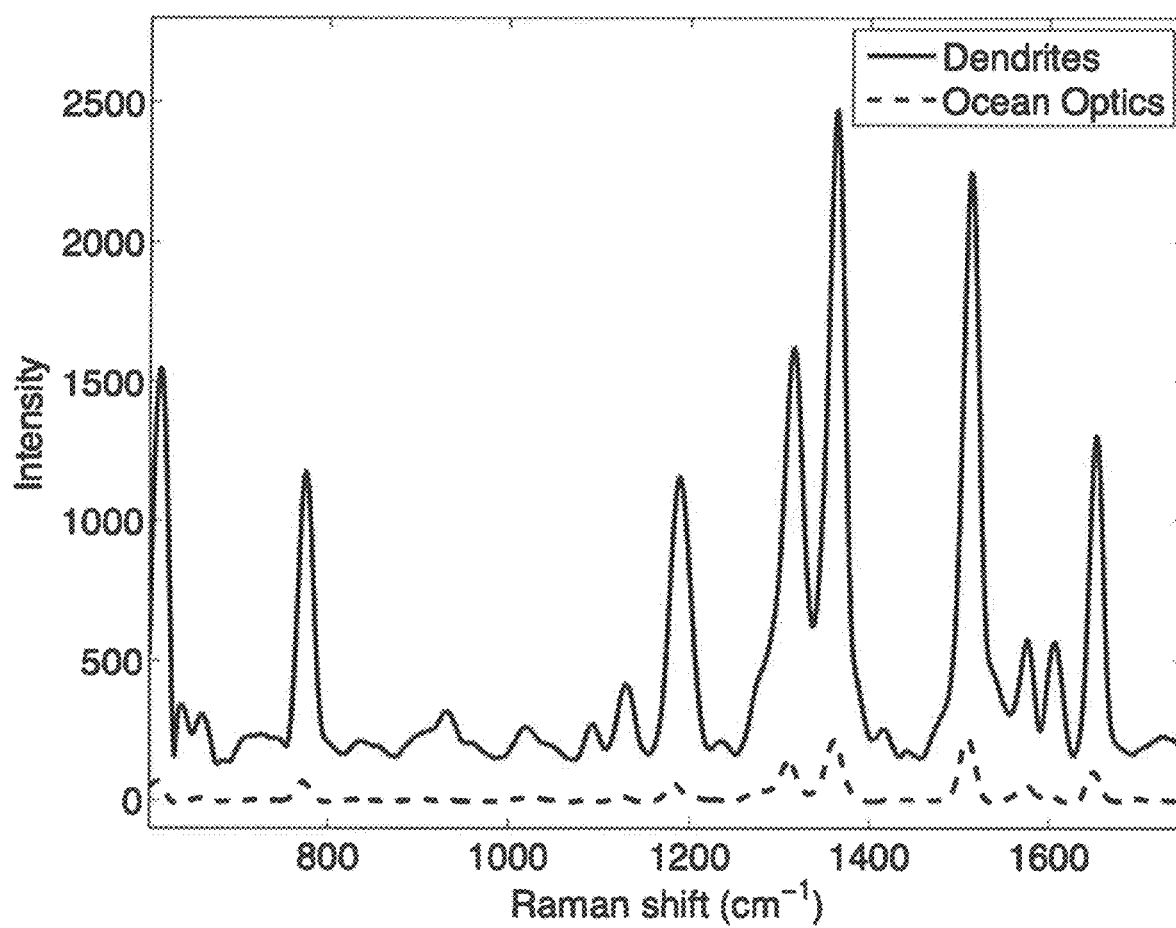
FIG. 4 is a plot showing a comparison of a SERS device according to one embodiment with electrokinetic deposition of AgNP dendrites (spectrum has been shifted up for visualization) and an Ocean Optics SERS substrate, for the detection of $10^{-5}$ M R6G.

Performance of electrokinetically-prepared AgNP dendritic SERS devices was tested against a commercially-available SERS substrate consisting of AuNPs deposited onto a paper sticker, which is supported upon a glass microscope slide (Ram-SERS-Au, Ocean Optics, Inc.). Spectra for the embodiment and the commercial substrate were taken at identical acquisition parameters (633 nm laser, 10 s acquisition time, and a ×10 objective to accommodate the Ocean Optics substrate thickness), and in both cases 10 µL of 10$^{-5}$ M R6G in methanol was drop cast onto the surface and allowed to evaporate. The spectra, shown in FIG. 4, demonstrate that under the testing conditions used, performance of the electrokinetically-prepared AgNP embodiment is significantly better than the commercial substrate.

The intensity of a dominant peak in the R6G spectra (at 1360 cm$^{-1}$), was used to calculate the SERS enhancement factor (EF), via equation (2):

$$EF = \frac{I_{SERS}/N_{SERS}}{I_{NR}/N_{NR}} \quad (2)$$

where $I_{SERS}$ and $I_{NR}$ are the (background corrected) intensities of the 1360 cm$^{-1}$ peak on the SERS device/substrate and on a silicon (normal Raman) surface, respectively, and $N_{SERS}$ and $N_{NR}$ are the number of analyte molecules adsorbed on the SERS and silicon surfaces, respectively. Using the data shown in FIG. 4, an EF of $4 \times 10^5$ was obtained for the embodiment, which, given an estimated surface coverage of 38% on the silicon surface, gives an EF per silver nanocluster region of $1 \times 10^6$. In comparison, an EF of $2 \times 10^4$ was obtained for the Ocean Optics substrate, which is comparable to other SERS substrates produced and/or used by researchers in the field [31]-[33].

Figure 5A:
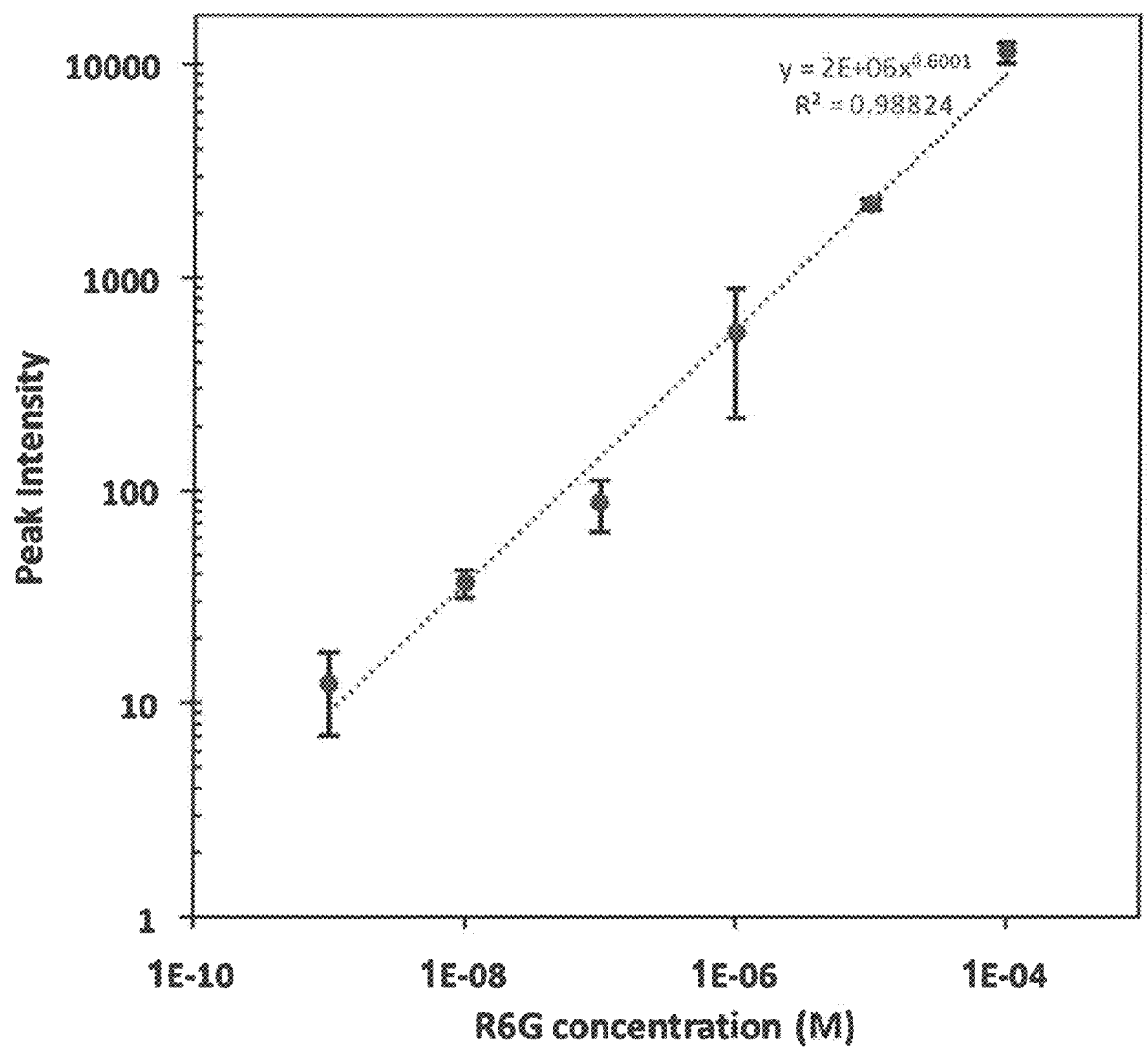
FIG. 5A is a log-log plot for calibration of a SERS device with R6G, according to one embodiment (error bars represent the standard deviation from repeated (n=6) measurements at identical acquisition parameters).
Figure 5B:
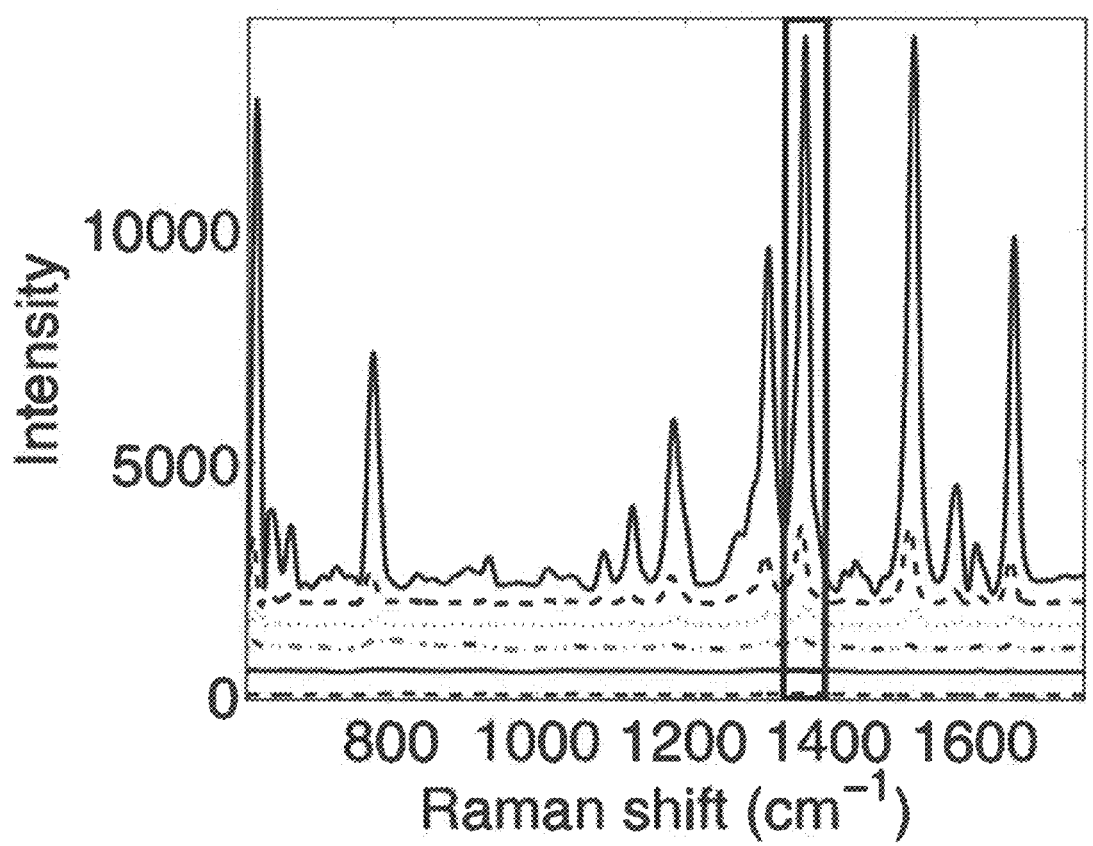
FIG. 5B is a plot showing the averaged SERS spectra for the embodiment in FIG. 5A, at concentrations from 0.1 mM to 1 nm (top to bottom), with the highlighted region indicating the peak used for calibration.

To demonstrate the quantitative detection capability of the AgNP embodiment, a calibration with R6G at concentrations from 0.1 mM to 1 nM was performed. The intensity of the 1360 cm$^{-1}$ peak was used for quantification. The results are shown in FIG. 5. The data show good linearity over 6 orders of magnitude, with an $R^2$ value of 0.98824.

Chemical Sensing Via Passive Surface Adsorption

Figures 6A, 6B, 6C:
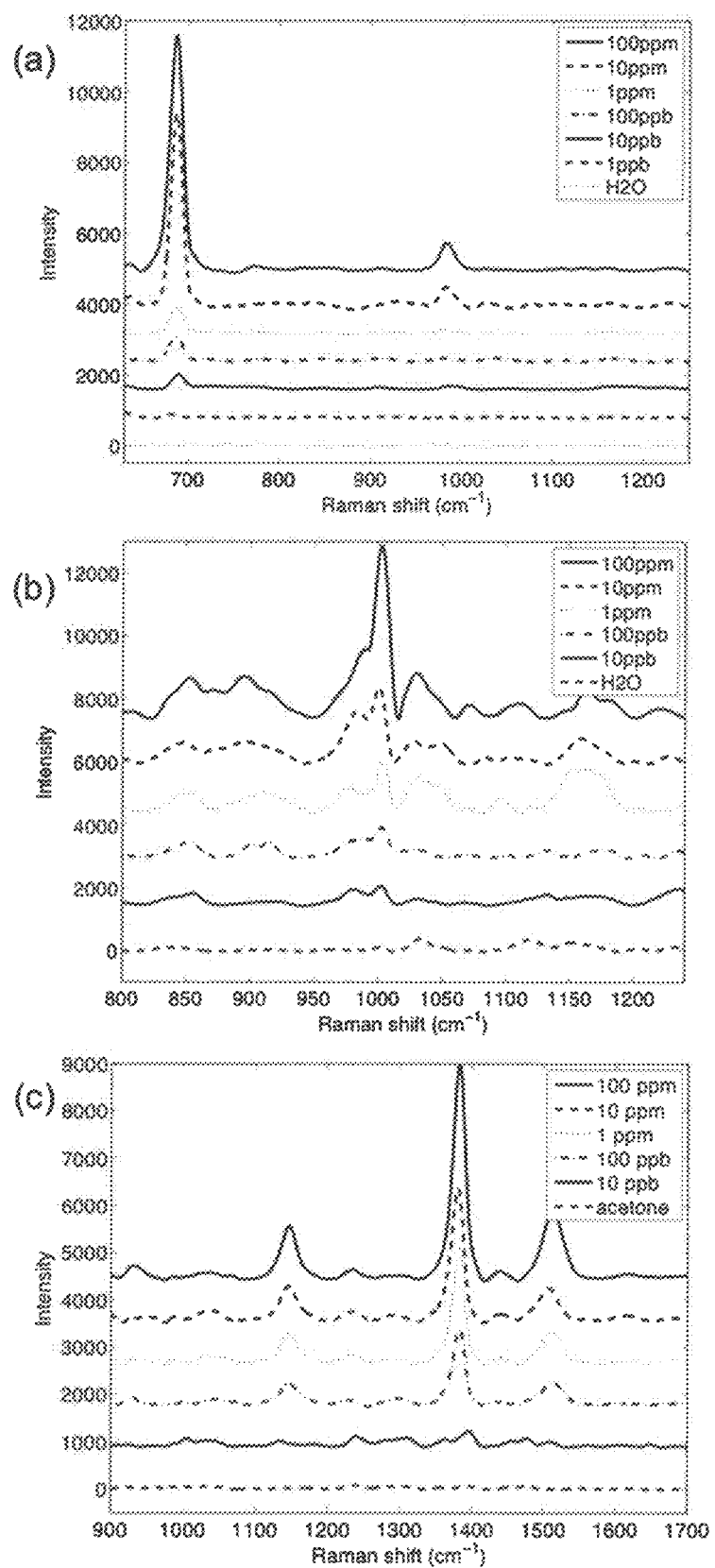

An AgNP SERS device was used for chemical sensing through passive surface adsorption of three biochemical analytes, relevant for fluid-based sensing: (1) melamine, (2)

cocaine, and (3) thiram. Melamine is a nitrogenous industrial chemical used in resin production and fertilizer, which, upon ingestion and metabolization, may form insoluble crystals in the kidney, leading to renal failure. Because of its high nitrogen content (66.7% by mass), melamine has been added to dairy products, infant formulations, or pet food, in order to boost the apparent protein content. Such use has resulted in the deaths of hundreds of cats and dogs in the United States in 2007, and the hospitalization of over 50,000 infants in China in 2008. The World Health Organization sets a safe allowable concentration for melamine in milk at 2.5 parts per million (ppm) and in infant formula at 1 ppm, and Health Canada reduces this to at or below 0.5 ppm. Results of melamine detection by the SERS device are shown in FIG. 6A. The most intense Raman peak of melamine is at 685 cm-1, which is assigned to the ring breathing II mode, characteristic of in-plane deformation of the triazine ring. Due to the strong SERS performance of the embodiment, melamine was detected at a concentration as low as 1 ppb. Current experiments are pursuing melamine detection in more complex food matrices, such as milk and infant formula.

Cocaine is an illicit drug associated with several detrimental health effects that may require urgent care. For example, in the United States in 2011, cocaine was associated with 40.3% of illicit-drug related emergency room visits. There is a pronounced need for a rapid and minimally-invasive technique cocaine detection method, in order to prescribe appropriate care and/or prevent drug-related accidents. SERS-based detection is particularly compatible with salivary drug testing, as saliva is 99.5% water, which presents a negligible background Raman signal for chemical analysis. The cutoff concentration for federal workplace testing of cocaine lies between 120-150 ppb, while the cutoff concentration for clinical applications is 10-50 ppb. The results of cocaine detection using the SERS device embodiment are shown in FIG. 6B. Cocaine solutions in water were drop-cast directly on the SERS device, and the most prominent peak at 1003 $cm^{-1}$ was used to identify analyte presence. A detection limit of 10 ppb was obtained, well below workplace testing limits and at the lower range of the limit for clinical applications.

Thiram is an organosulfur compound commonly used as a fungicide or animal repellant in industry and agriculture. Upon metabolization, thiram produces carbon disulfide, which is toxic to the liver. The US Environmental Protection Agency prescribes a maximal residue limit of 7 ppm for thiram in food products. Most current methods of monitoring pesticide concentrations in fruits and vegetables use HPLC. As shown in FIG. 6C, a detection limit of 10 ppb was obtained for thiram in acetone.

Biosensing Via Electrokinetically Amplifying the Local Analyte Concentration

In the above experiments, a SERS device was shown to provide sensitive detection of chemical analytes at ultralow concentrations through passive adsorption. However, electric field induced assembly (with DC offset) of nanoparticle dendrites as electrically-attached extensions on microelectrodes may provide an additional function of active analyte concentration amplification if the electric field is maintained in the presence of the analyte. More specifically, by bridging the gap between microelectrodes, a SERS device with a dendritic nanoparticle structure can generate much higher intensity electric fields (E=V/d). The strong forces that develop attract analytes from the bulk sample and locally concentrate them on the detection site. Without the dendritic nanoparticle structure, dielectrophoresis alone (scaling with $r^3$) would only be capable of attracting large biological objects, such as bacteria and viruses. In the presence of a dendritic nanoparticle structure, however, this capability may be extended to smaller objects, such as biomolecules (e.g., proteins, DNA). To demonstrate the principal of active analyte concentration amplification here, the technique is applied to the detection of BSA, an abundant plasma protein, as well as E. coli K12, a Gram negative rod-shaped bacterium.

Figure 7A:
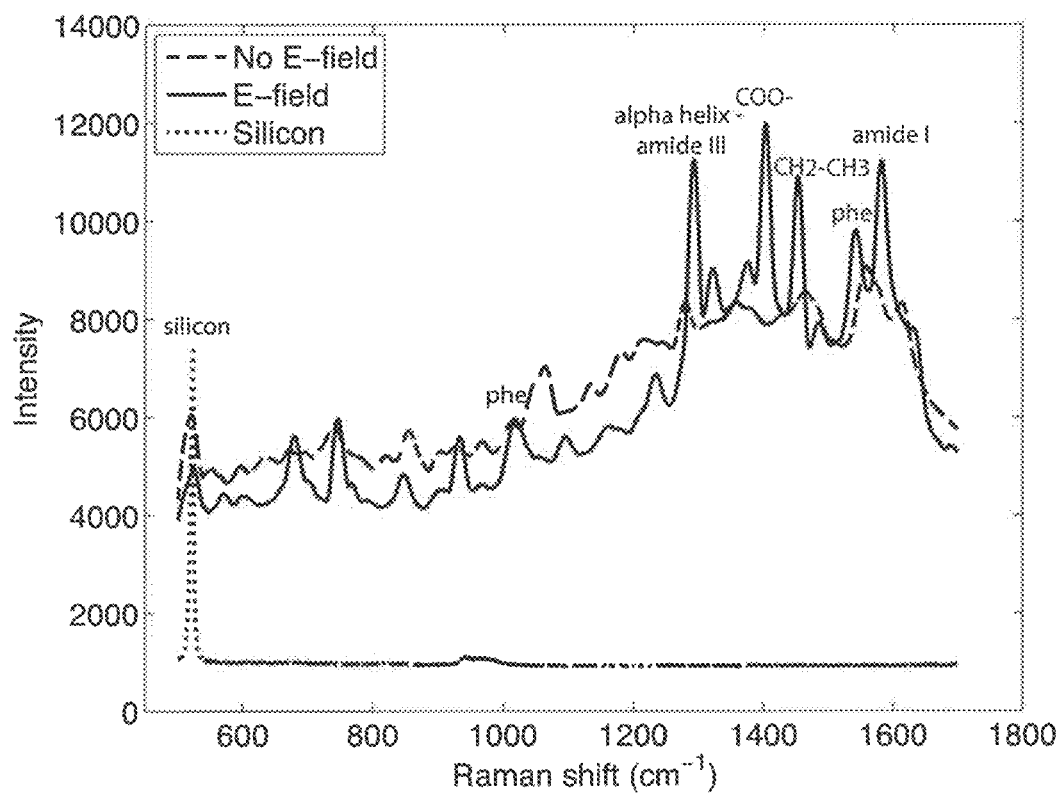
FIGS. 7A and 7B are plots of spectra obtained for BSA (FIG. 7A) and *E. coli* K12 (FIG. 7B) using a SERS device embodiment and electrokinetic concentration of the analytes; "Silicon" shows that no signal is observed in the absence of AgNP dendrites.

BSA is a globular, water soluble protein, with a well-known primary structure (molecular weight 66 267 Da). BSA was dissolved at 0.5 wt % in water and 5 µL of the protein solution was deposited on the AgNP SERS active microelectrode surface. Detection results for BSA are shown in FIG. 7A (the peaks have been assigned based on those reported in the literature). In the microelectrode gap that is activated such that the microelectrodes exert a dielectrophoretic force on the protein molecules, a distinct SERS spectrum is measured, with amplification coming from two sources: (1) the SERS enhancement, and (2) analyte electrokinetic concentration. The observed peaks agree well with the alpha-helix rich structure of BSA. At the microelectrode gap which allowed for passive protein adsorption, a less distinct spectrum is produced. This spectrum still experiences amplification from the SERS device, but does not adsorb sufficient protein to provide a distinct spectrum for analysis. Identification may still be possible with chemometric spectral analysis, but this would require several spectral measurements and model training. On the unmodified silicon surface, no signal is observed from the protein, i.e., conventional Raman spectroscopy is not sufficient for detection.

Figure 7B:
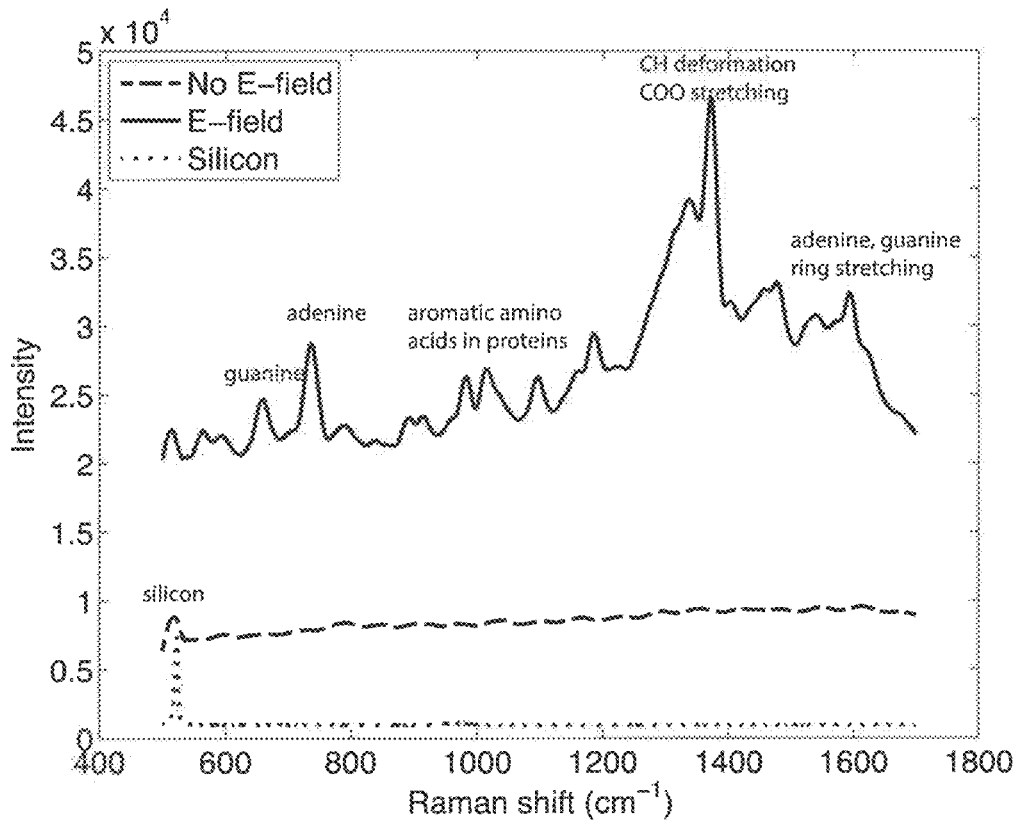

For E. coli K12, results similar to those for BSA were obtained, for detection via electrode activation. A narrow spectral region was analyzed, and peaks from amino acids, as well as CH deformations and CHO stretching were identified. Because E. coli is a larger analyte than BSA (it is ~2 µm in length), it experiences a greater dielectrophoretic force ($\propto r^3$) and enhanced electrokinetic concentration to the detection region. Therefore, the small 'No E-field' spectral intensities in FIG. 7B may be due to a significantly depleted analyte concentration in those regions, i.e., most, if not all of the bacteria have been concentrated to a single microelectrode gap. Here, E. coli were detected at a concentration of $10^6$ bacteria/mL; however, it is expected that with the combined electrokinetic concentration and SERS enhancement, the LOD will exceed $10^2$ bacteria/mL.

Example 2

Figure 8:
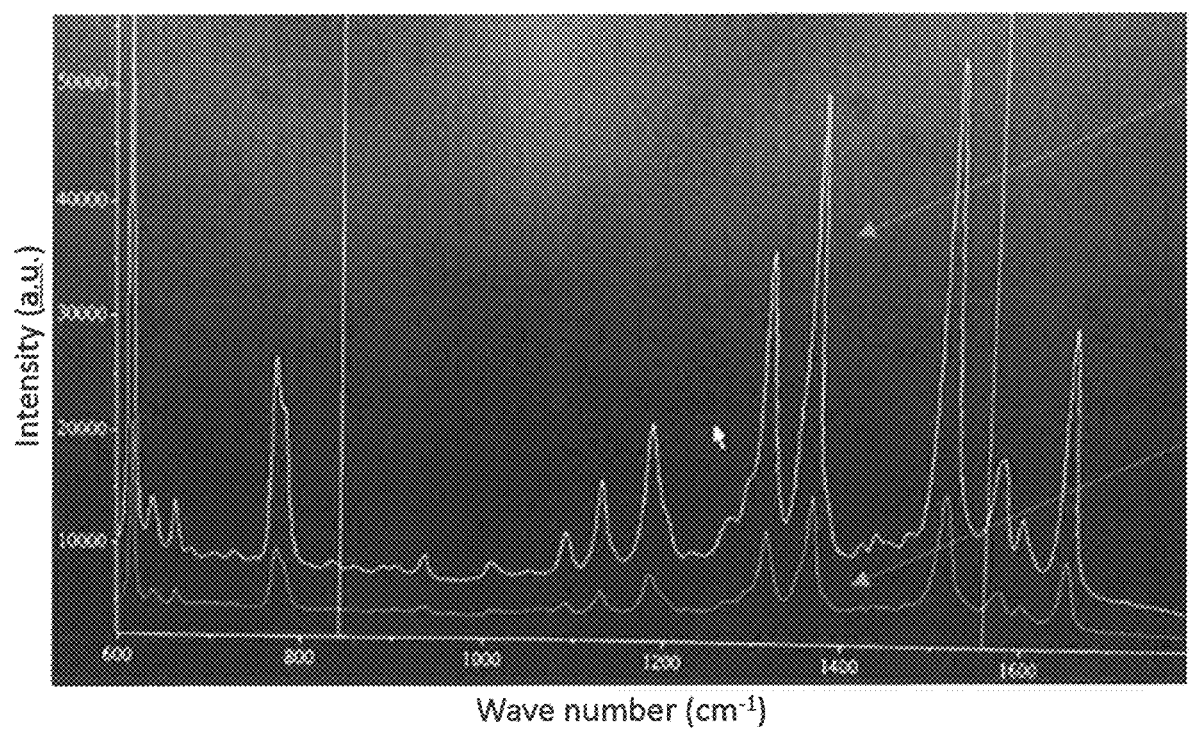
FIG. 8 is a screen shot showing SERS signals obtained from rhodamine 6G (R6G) using uncoated dendrites (lower trace) and graphene-coated dendrites (upper trace).

An experiment was conducted to examine the effect of graphene surface treatment of nanoparticle structures on SERS performance. Two SERS devices were prepared. One SERS device was prepared as described above using Ag nanoparticles, without surface treatment of the nanoparticle structure (uncoated dendrites). Another SERS device was prepared the same way, and then the dendrites received a surface treatment with graphene. A graphene coating was achieved by spray-coating the dendrites using a suspension of graphene dispersed in NMP (N-methylpyrrolidone). In this case, the graphene was a several-layer graphene obtained from an in-house exfoliation method of graphite by means of ultrasonication in a surfactant solution. FIG. 8 shows the SERS signal obtained from rhodamine 6G (R6G) that was dropcast from an ethanol solution (concentration of $10^{-5}$ M) onto the uncoated dendrites (lower trace) and graphene-coated dendrites (upper trace). Overall, 2- to 5-fold SERS signal enhancement was observed.

INCORPORATION BY REFERENCE

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A surface enhanced Raman spectroscopy (SERS) device, comprising:
    a first non-electrically conductive substrate;
    at least a first electrode disposed directly on the first non-electrically conductive substrate;
    at least a second electrode disposed on a second non-electrically conductive substrate, and the first and second non-electrically conductive substrates are arranged face-to-face, the second electrode being movable relative to the first electrode, wherein a 3-D electrode configuration is provided and a detection site is formed along edges and/or between opposing edges of the first and second electrodes; and
    a nanoparticle structure comprising a plurality of metallic nanoparticles disposed in the detection site along edges and/or between opposing edges of the first and second electrodes in the absence of an analyte;
    wherein the nanoparticle structure comprises at least one of a branched, clustered, aggregated, fractal, and dendritic structure.

2. The SERS device of claim 1, wherein the metallic nanoparticles comprise a metal selected from silver, gold, copper, and platinum, or a combination of two or more thereof.

3. The SERS device of claim 1, wherein the nanoparticle structure is directed by an electric field between the at least two electrodes.

4. The SERS device of claim 3, wherein the electric field comprises an AC electric field, a DC electric field, an AC electric field with a DC component, and an electrostatic field.

5. The SERS device of claim 1, wherein the nanoparticle structure is a dendritic structure.

6. The SERS device of claim 1, wherein a surface modification of the nanoparticles includes graphene or a derivative thereof.

7. The SERS device of claim 1, wherein the nanoparticle structure concentrates an analyte at the detection site.

8. The SERS device of claim 1, wherein the nanoparticle structure is removably assembled in the detection site, wherein the device is reusable.

9. A method of preparing a SERS device, comprising:
    providing a first non-electrically conductive substrate having at least a first electrode disposed directly on the first non-electrically conductive substrate;
    providing at least a second electrode disposed on a second non-electrically conductive substrate, and the first and second non-electrically conductive substrates are arranged face-to-face, the second electrode being movable relative to the first electrode, wherein a 3-D electrode configuration is provided and a detection site is formed along edges and/or between opposing edges of the first and second electrodes; and
    disposing a plurality of metallic nanoparticles on the detection site under a condition that induces, directs, or influences assembly of the metallic nanoparticles into a nanoparticle structure in the detection site along edges and/or between opposing edges of the first and second electrodes in the absence of an analyte;
    wherein the nanoparticle structure comprises at least one of a branched, clustered, aggregated, fractal, and dendritic structure.

10. The method of claim 9, wherein the metallic nanoparticles comprise at least one metal selected from silver, gold, copper, platinum, and a combination of two or more thereof.

11. The method of claim 9, wherein the condition that induces, directs, or influences assembly of the metallic nanoparticles into a nanoparticle structure comprises an electric field.

12. The method of claim 11, comprising an AC electric field, a DC electric field, an AC electric field with a DC component, or an electrostatic field.

13. The method of claim 9, wherein the nanoparticle structure is a dendritic structure.

14. The method of claim 9, wherein a surface modification of the nanoparticles includes graphene or a derivative thereof.

15. The method of claim 9, comprising removably assembling the nanoparticle structure in the detection site.

16. A method of analyzing a sample using SERS, comprising:
    applying the sample to the detection site of the SERS device of claim 1; and
    using SERS to probe the sample at one or more locations in the detection site.

17. The method of claim 16, wherein an electric field is present during application of the sample.

18. The method of claim 16, wherein an analyte in the sample is concentrated at the detection site.

19. The SERS device of claim 1, wherein the second electrode is disposed on a structure;
    wherein the first non-electrically conductive substrate and the structure are in a 3-D arrangement;
    wherein a 3-D electrode configuration is provided.

20. The SERS device of claim 19, wherein the second electrode is movable relative to the first electrode.

21. The SERS device of claim 19, wherein the second electrode comprises a probe.

22. The SERS device of claim 1, wherein the second electrode is disposed on the first non-electrically conductive substrate;
    wherein a 2-D electrode configuration is provided.

23. The method of claim 9, wherein the second electrode is disposed on a structure;
    wherein the first non-electrically conductive substrate and the structure are in a 3-D arrangement;
    wherein a 3-D electrode configuration is provided.

24. The method of claim 23, wherein the second electrode comprises a probe.

25. The method of claim 23, wherein the second electrode is disposed on a second non-electrically conductive substrate, and the first and second non-electrically conductive substrates are arranged face-to-face;
    wherein a 3-D electrode configuration is provided.

26. The method of claim 9, wherein the second electrode is disposed on the first non-electrically conductive substrate; wherein a 2-D electrode configuration is provided.

* * * * *